No. 781,209. Patented January 31, 1905.

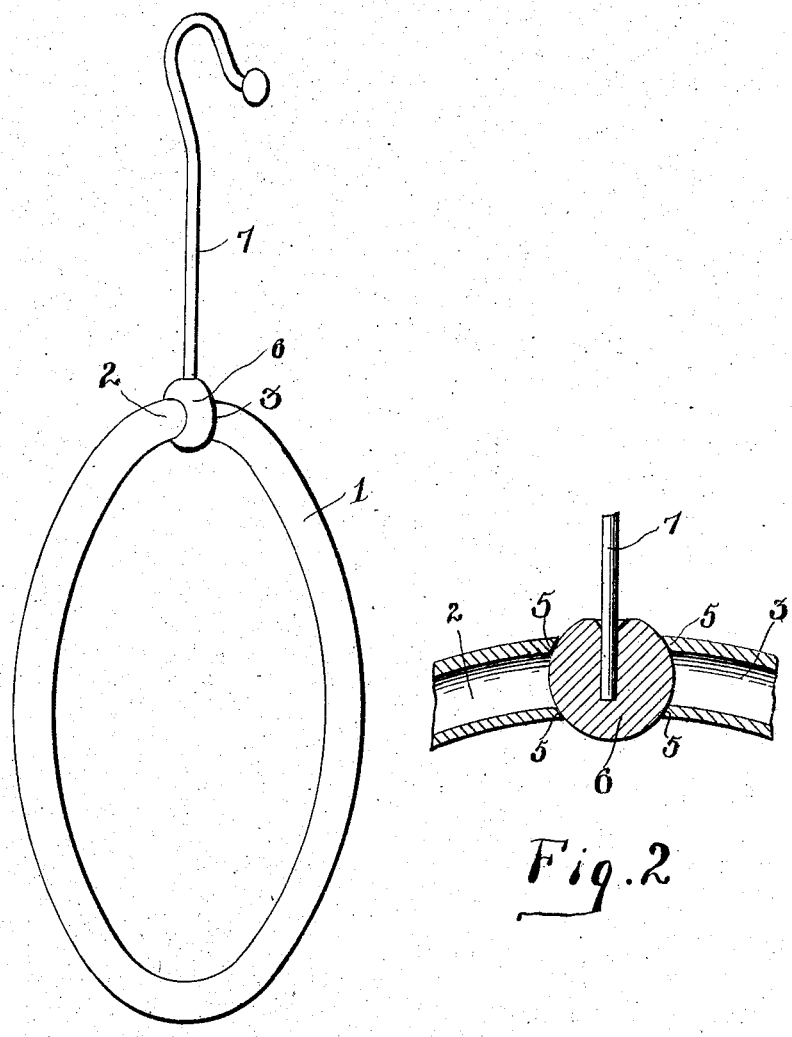

UNITED STATES PATENT OFFICE.

HORACE D. JONES, OF CINCINNATI, OHIO, ASSIGNOR OF ONE-HALF TO GEORGE STEVENSON, GEORGE BISHOP, AND MILTON SCHLOSS, OF CINCINNATI, OHIO.

UNIVERSAL JOINT.

SPECIFICATION forming part of Letters Patent No. 781,209, dated January 31, 1905.

Application filed April 28, 1904. Serial No. 205,400.

*To all whom it may concern:*

Be it known that I, HORACE D. JONES, a citizen of the United States, residing at Cincinnati, in the county of Hamilton and State of Ohio, have invented certain new and useful Improvements in Universal Joints; and I do declare the following to be a full, clear, and exact description of the invention, such as will enable others skilled in the art to which it appertains to make and use the same.

This invention relates to swivel or universal joints, and has for its object to provide a neat, simple, and effective joint of this character which may be employed upon different kinds of articles made to subserve a variety of purposes.

In the accompanying drawings, Figure 1 is a perspective view of a bracket or fixture embodying my invention, and Fig. 2 is a sectional view through the joint on an enlarged scale.

1 denotes a tubular body in the form of a split ring made of spring metal. The ends of this body are adapted to yield outwardly under pull or pressure and to be forced toward each other by the resilient action of the ring, and hence form jaws 2 and 3, while the remainder of the body serves the function of a spring connecting portion joining the inner ends of the jaws together. The faces of the jaws are beveled to provide concaved seats 5. Disposed between the jaws is a spherical head 6, which fits against said seats 5 and is free to turn between the same. This head may carry any preferred type of bracket arm or support 7, which is adjustable therewith to any position within the limit of movement of said head in either direction, or the head may form part of a fixed bracket or support adapted to be secured to a wall or other surface, or the ring itself may be provided with means to fix it to a surface. In other words, the head may turn upon the ring or the ring upon the head and either thus be employed as a support. The frictional engagement between the ring or head will of course be sufficient to maintain one or the other in adjusted position.

The device may be used as a holder for toilet accessories, such as towels, &c., or as a bracket or display-support, or as an adjunct for window or other display fixtures of any kind, and for many other various uses, and either part of the device may be used as the fixed element at will. Various types of hooks, brackets, or other supporting elements may also be applied to the part employed as the movable member to enable the same to be adjusted to any angle for use. In coupling and uncoupling the parts the ends of the ring are sprung apart to allow the head to be inserted or removed, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A device of the character described comprising a hollow resilient split ring, the ends of which form jaws and are provided with segmental seats, and a spherical head disposed and retained between the jaws, engaging the said seats and movable angularly in any direction between the ends of the split ring, substantially as described.

2. A device of the class described comprising a split ring having segmental seats in its ends, a spherical head between the ends of the ring and engaging the seats therein, said spherical head being movable angularly in any direction between the ends of the split ring, and a hook attached to the said head, substantially as described.

In testimony whereof I have hereunto set my hand in presence of two subscribing witnesses.

HORACE D. JONES.

Witnesses:
S. MAHLON UNGER,
JOSEPH A. MINTURN.